(12) United States Patent
Ahlert et al.

(10) Patent No.: US 7,774,702 B2
(45) Date of Patent: Aug. 10, 2010

(54) METHOD AND COMPUTER SYSTEM FOR PROVIDING AND PROCESSING A HUMAN INTERFACE DESCRIPTION

(75) Inventors: Dirk Ahlert, Mühlhausen (DE); Wolfgang Koch, Dielheim (DE); Gunther Liebich, Walldorf (DE)

(73) Assignee: SAP AG, Walldorf (DE)

( * ) Notice: Subject to any disclaimer, the term of this patent is extended or adjusted under 35 U.S.C. 154(b) by 826 days.

(21) Appl. No.: 10/484,879

(22) PCT Filed: Apr. 16, 2002

(86) PCT No.: PCT/EP02/04206
§ 371 (c)(1),
(2), (4) Date: Jul. 30, 2004

(87) PCT Pub. No.: WO03/012632
PCT Pub. Date: Feb. 13, 2003

(65) Prior Publication Data
US 2004/0249486 A1    Dec. 9, 2004

(30) Foreign Application Priority Data
Jul. 27, 2001    (EP) .................................. 01118304

(51) Int. Cl.
*G06F 17/00* (2006.01)
(52) U.S. Cl. ...................................... 715/243; 715/234
(58) Field of Classification Search ................ 715/507, 715/866, 513, 503–506, 508–510, 760, 234, 715/212–228, 236, 243
See application file for complete search history.

(56) References Cited

U.S. PATENT DOCUMENTS

| | | | |
|---|---|---|---|
| 5,860,073 A | 1/1999 | Ferrel et al. | ................. 715/522 |
| 5,944,781 A | 8/1999 | Murray | |
| 6,023,714 A | 2/2000 | Hill et al. | |

(Continued)

FOREIGN PATENT DOCUMENTS

EP    0 812 088 A2    12/1997

(Continued)

OTHER PUBLICATIONS

Pemberton, XForms 1.0, Feb. 2001, W3C, Working Draft 1.0, pp. 1-83 & Appendix B, pp. 1-61.*

(Continued)

*Primary Examiner*—Stephen S Hong
*Assistant Examiner*—Manglesh M Patel
(74) *Attorney, Agent, or Firm*—Finnegan, Henderson, Farabow, Garrett & Dunner, LLP

(57) ABSTRACT

Computer-implemented method, computer system and computer program product for providing and processing a human interface description. A user submits data 170 by using an human interface description 160. The data 170 comprise status information of at least one layout element of human interface description 160. The computer system receives 480 the data 170. Optionally, the computer system stores 485 the data 170 in a data instance 150. The data instance 150 can be modified by an application program via interface 155. Preferably, the computer system provides the human interface description 160 by merging 470 a layout template 140-1 with the data instance 150. Preferably, the data instance 150 is instantiated from a data description 140-2.

6 Claims, 4 Drawing Sheets

U.S. PATENT DOCUMENTS

| | | | |
|---|---|---|---|
| 6,083,276 A | 7/2000 | Davidson et al. | |
| 6,192,380 B1* | 2/2001 | Light et al. | 715/505 |
| 6,226,632 B1 | 5/2001 | Takahashi et al. | |
| 6,279,015 B1 | 8/2001 | Fong et al. | |
| 6,429,882 B1* | 8/2002 | Abdelnur et al. | 715/763 |
| 6,516,349 B1* | 2/2003 | Lieberman | 709/225 |
| 6,582,474 B2 | 6/2003 | LaMarca et al. | |
| 6,589,290 B1* | 7/2003 | Maxwell et al. | 715/507 |
| 6,603,489 B1* | 8/2003 | Edlund et al. | 715/780 |
| 6,651,217 B1* | 11/2003 | Kennedy et al. | 715/507 |
| 6,701,308 B1 | 3/2004 | Chen et al. | |
| 6,701,486 B1* | 3/2004 | Weber et al. | 715/209 |
| 6,801,224 B1 | 10/2004 | Lewallen | |
| 6,922,810 B1* | 7/2005 | Trower et al. | 715/534 |
| 6,928,623 B1* | 8/2005 | Sibert | 715/783 |
| 6,941,510 B1 | 9/2005 | Ozzie et al. | |
| 6,968,503 B1 | 11/2005 | Chang et al. | |
| 6,981,028 B1* | 12/2005 | Rawat et al. | 709/217 |
| 7,039,863 B1 | 5/2006 | Caro et al. | |
| 7,058,886 B1* | 6/2006 | Sulistio et al. | 715/517 |
| 7,117,429 B2 | 10/2006 | Vedullapalli et al. | |
| 7,143,359 B2* | 11/2006 | Aggarwal et al. | 715/760 |
| 7,222,087 B1* | 5/2007 | Bezos et al. | 705/26 |
| 7,234,105 B2* | 6/2007 | Bezrukov et al. | 715/202 |
| 7,324,983 B1* | 1/2008 | Morris et al. | 706/48 |
| 7,392,468 B2 | 6/2008 | Igata et al. | |
| 2001/0014900 A1 | 8/2001 | Brauer et al. | |
| 2001/0056460 A1 | 12/2001 | Sahota et al. | |
| 2002/0054081 A1 | 5/2002 | Mimoun | |
| 2002/0093530 A1* | 7/2002 | Krothapalli et al. | 345/745 |
| 2002/0111963 A1 | 8/2002 | Gebert et al. | |
| 2004/0003341 A1* | 1/2004 | alSafadi et al. | 715/500 |
| 2004/0039988 A1* | 2/2004 | Lee et al. | 715/505 |
| 2004/0083453 A1* | 4/2004 | Knight et al. | 717/113 |
| 2004/0205530 A1* | 10/2004 | Borg | 715/507 |
| 2004/0249487 A1 | 12/2004 | Ahlert et al. | |
| 2005/0034066 A1 | 2/2005 | Ahlert et al. | |
| 2005/0120043 A1 | 6/2005 | Lee et al. | |
| 2006/0224397 A1* | 10/2006 | Morris et al. | 705/1 |
| 2007/0186150 A1* | 8/2007 | Rao et al. | 715/506 |

FOREIGN PATENT DOCUMENTS

| | | |
|---|---|---|
| EP | 1100013 | 5/2001 |
| WO | WO 9917193 | 4/1999 |
| WO | WO 9963473 | 12/1999 |
| WO | WO 00/33535 | 6/2000 |
| WO | WO 0034860 | 6/2000 |
| WO | WO 00/52564 | 8/2000 |
| WO | WO 0052596 | 9/2000 |
| WO | WO 00/72197 | 11/2000 |
| WO | WO 01/18630 | 3/2001 |
| WO | WO 01/18630 A | 3/2001 |
| WO | WO 01/29636 | 4/2001 |

OTHER PUBLICATIONS

Khare, Can Xform Transform the Web?, Mar. 9, 2000, Seventh heaven, pp. 1-12.*

Ken Holman, What is XSLT, Aug. 16, 2000, XML.com, pp. 1-46.*

Dubinko et al., Xforms 1.0 W3C Working Draft Jun. 8, 2001, pp. 1-114.*

"XSL Transformations (XSLT)," W3C Recommendation, Online, Nov. 16, 1999, XP002189938, retrieved from the Internet, URL:http://www.W3.org/TR/xslt retrieved on Feb. 11, 2002, paragraphs '0001 and '0002, pp. 1-102.

Holzner et al., "XML to XHTML Transformations with XSLT Processors", Jun. 22, 2001, pp. 1-4.

Phanouriou, "UIMLA:A Device-Independent User Interface markup Language", Sep. 26, 2006, pp. 1-161.

"XSL Transformations (XSLT)," W3C Recommendation, Nov. 16, 1999, XP002189938, retrieved from the Internet: http://www.w3.org/TR/xslt, Sections 1-2.7 (11 pages).

Dubinko et al., "Xforms 1.0, Feb. 2001, W3C, Draft 16", Feb. 2001, pp. 1-179.

Goeschka K. M. et al., "Client and Legacy Integration in Object-Oriented Web Engineering" IEEE Multimedia, vol. 8, No. 1 Mar. 2001, pp. 32-41.

Meyer T. et al., "WAXweb: a MOO-based collaborative hypermedia system for WWW", 1995, pp. 77-84.

European Office action dated Feb. 2, 2008, for application No. EP 01118304, 3 pages.

* cited by examiner

METHOD AND COMPUTER SYSTEM FOR PROVIDING AND PROCESSING A HUMAN INTERFACE DESCRIPTION

This application is a national stage filing under 35 U.S.C. §371 of International Application No. PCT/EP02/04206, filed Apr. 16, 2002, which published in the English language.

FIELD OF THE INVENTION

The present invention generally relates to a human interface of a data processing system and, more particularly, relates to computer-implemented methods and computer systems to interact with a computer through a human interface.

BACKGROUND OF THE INVENTION

In prior art systems, human interfaces are described with a standardized human interface description language (SIDL). The term "human interface" as used hereinafter, describes any kind of application interface for a human to interact with application programs that run on a computer. Examples for human interfaces are graphical user interfaces (GUI) or voice user interfaces (VUI).

Typically the SIDL is a "Extensible Markup Language" (XML) based language that provides a set of layout components. A layout component comprises description instructions that describe a specific element of the human interface. These description instructions are called layout element (LE), hereinafter. A transformer program, comprising transformation rules, transforms the layout element into a browser compliant description.

A browser, as used hereinafter, is a computer program that "renders" a document which is written, in a markup language, such as "Hyper Text Markup Language" (HTML), "Wireless Markup Language" (WML) or "Voice Extensible Markup Language" (VXML), into a visual or audio presentation of this document. A browser can be device specific. For example, a browser that renders a HTML document on a personal computer screen differs from a browser that renders a WML document on a wireless application protocol (WAP) cell phone display.

The browser compliant description can be rendered by a conventional browser into corresponding visual or audio layout elements on an output device of a computer as part of the human interface. In a SIDL, the layout elements typically have an application independent character, such as "row," "cell," "table," "grid," etc. Such layout elements can be reused in any context of any application.

In prior art human interfaces, often, the human interface is re-rendered in its initial state after a user interaction occurred. For example, when a user interacts with a web application by inputting data via the human interface and submitting the data to the web application, typically, after the submission of data the human interface shows all input fields with their initial values (e.g. empty or preset with a default value). Sometimes this is inconvenient because the user simply wants to correct a single input out of a plurality of inputs already made. In this case all previous inputs have to be re-entered. Also when complementing inputs already made earlier by a further input, all previous inputs have to be re-entered.

SUMMARY OF THE INVENTION

Hence, the present invention provides computer-implemented methods, computer systems and computer program products, to solve the technical problem of prompting a user with a human interface after an interaction of the user with the computer, wherein the human interface "remembers" its status before the interaction. "Remember" in this context is used to describe the ability of the inventive computer system to keep the status of a layout element, such as the expansion status of a hierarchy.

For convenience of explanation and without the intention of limiting embodiments of the present invention, in the following description of the present invention it is assumed that the human interface is a graphical user-interface. However, the term "layout element," as used hereinafter to describe a graphical layout element, also has a meaning in a voice human interface, where it corresponds to a sequence of sounds (e.g., spoken words) that follows a specific dialogue (interaction) schema.

A solution to the technical problem, according to a preferred embodiment of the present invention, may be provided by the following characteristics: The inventive computer system:

a) provides a human interface description to prompt an user for data input; and b) receives data from the user, wherein the data comprise a status of at least one layout element of the human interface description.

Optionally, the inventive computer system c) stores the data.

When providing a) the human interface description, in a preferred embodiment, the inventive computer system may d) provide a layout template and a data description;

e) instantiate a data instance from the data description; and f) merge the data instance with the layout template into an human interface description.

Therefore, it is a further advantage of the present invention that the user, upon inputting data through the human interface and submitting the data, may be prompted with an human interface that shows the same status as before the data submission occurred. For example, when the user has expanded a hierarchy to input data that relate to a certain node of the hierarchy, the expansion status of the hierarchy after data submission remains the same as of before data submission.

At any place in the description of the present invention where a style sheet language transformation, such as XSLT, is used to define transformation or conversion rules, alternatively, a person of skill in the art can implement these rules in any programming language, such as Java, as well.

The aspects of the invention will be realized and attained by means of the elements and combinations particularly pointed out in the appended claims. It is to be understood that both, the foregoing general description and the following detailed description are exemplary and explanatory only and are not restrictive of the invention as described.

DETAILED DESCRIPTION

Wherever possible, the same reference numbers will be used throughout the drawings to refer to the same or like parts. For convenience of explanation the reference number table at the end or the description lists the most important reference numbers and their descriptions.

Figure 1:
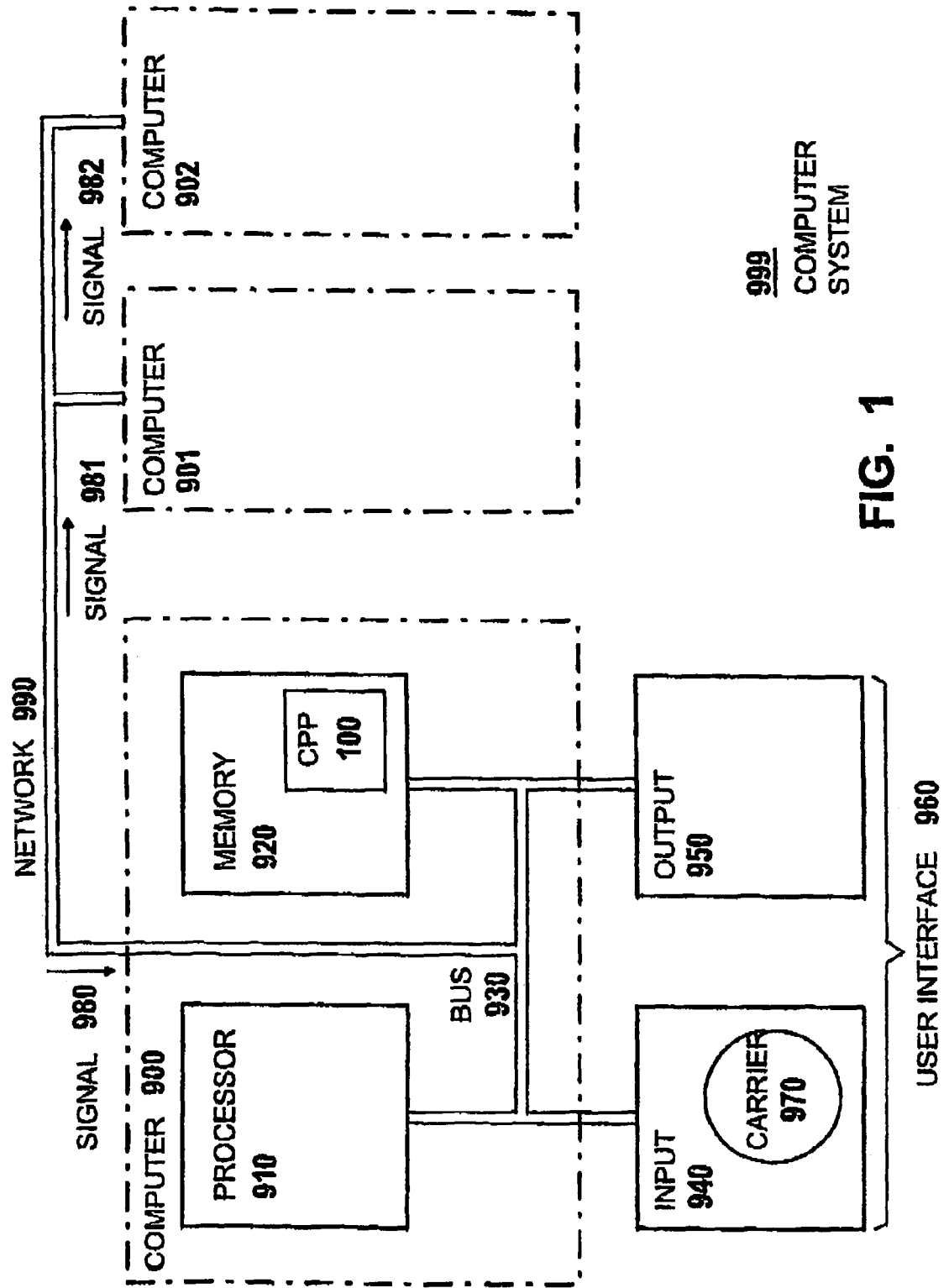
FIG. 1 illustrates a block diagram of an exemplary implementation of the inventive computer network system.

FIG. 1 illustrates a block diagram of an exemplary implementation of the inventive computer network system 999 having a plurality of computers 900, 901, 902 (or 90$q$, with $q=0 \ldots Q-1$, Q any number).

Computers 900-902 are coupled via inter-computer network 990. Computer 900 comprises processor 910, memory 920, bus 930, and, optionally, input device 940 and output device 950 (I/O devices, user interface 960). As illustrated, the invention is present by computer program product 100 (CPP), program carrier 970 and program signal 980, collectively "program."

In respect to computer 900, computer 901/902 is sometimes referred to as "remote computer," computer 901/902 is, for example, a server, a router, a peer device or other common network node, and typically comprises many or all of the elements described relative to computer 900. Hence, elements 100 and 910-980 in computer 900 collectively illustrate also corresponding elements 10$q$ and 91$q$-98$q$ (shown for $q=0$) in computers 90$q$.

Computer 900 is, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., cache; register), or elsewhere. Memory 920 can be a read only memory (ROM), a random access memory (RAM), or a memory with other access options. Memory 920 is physically implemented by computer-readable media, such as, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick, or by any other media, like paper.

Optionally, memory 920 may be distributed across different media. Portions of memory 920 can be removable or non-removable. For reaching from media and for writing in media, computer 900 may use devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or a display, (cathode ray tube (CRT), flat panel display, liquid crystal display (LCD), speaker, printer, plotter, vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930," connections between computer 900-902 are referred to as "network 990." Optionally, network 990 comprises gateways being computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the internet (i.e., world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN), an Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are known, for example, as transmission control protocol/internet protocol (TCP/IP), hyper text transfer protocol (HTTP), secure HTTP, wireless application protocol. unique resource locator (URL), a unique resource identifier (URI), hyper text markup language (HTML), extensible markup language (XML), extensible hyper text markup language (XHTML), wireless application markup language (WML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computers and programs are closely related. As used hereinafter, phrases, such as "the computer provides" and "the program provides," are convenient abbreviations to express actions by a computer that is controlled by a program. Furthermore, the term "preferably" is nonexclusive and means "preferably, but not limited to."

It is not important for the present invention, where computer programs, files or documents are stored in computer system 999. For convenience of explanation, they are stored in memory 920 of computer 900.

Figure 2:
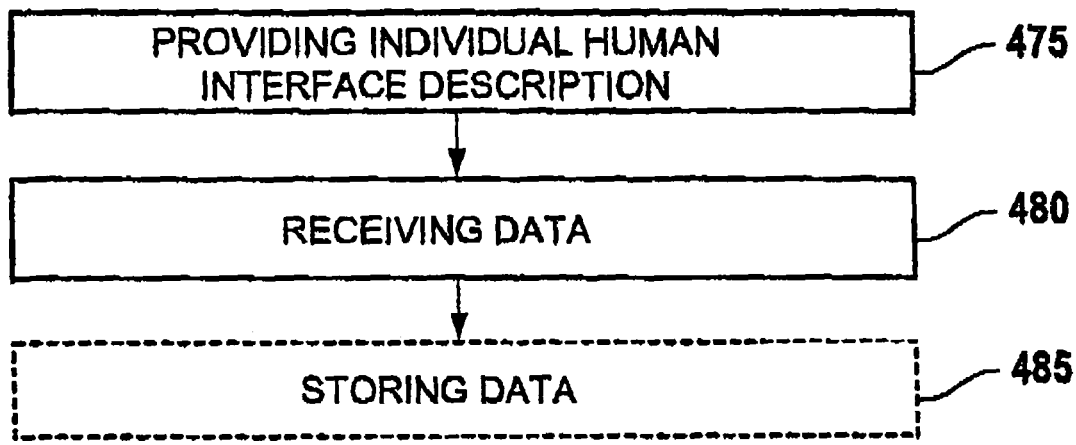
FIG. 2 illustrates a flow chart of a preferred embodiment of an exemplary implementation of the inventive method for providing and processing a human interface description.

FIG. 2 illustrates a flow chart of an exemplary embodiment of the inventive method 400 for providing and processing a human interface description.

The human interface example that is used throughout the detailed description is a survey application example. The controller of a company wants to capture financial planning data for the fiscal year 2002 from other managers in the company. For this reason, the controller creates a survey questionnaire, comprising various question groups. Each question group refers to a specific field, such as "planned costs," or "planned revenues." Each question group can comprise various questions. The question used in this example belongs to the question group "planned costs" and captures "Planned travel costs 2002:". Managers prompted with the questionnaire input their planning data next to the test of the question in a corresponding input field and submit the data after having filled in the relevant planning data.

All tables with program coding sections that are used in the description are exemplary and explanatory only and not intended to provide a fully functional computer program coding.

Preferably, method 400 may comprise the following steps a) and b):

a) providing 475 human interface description 160 to prompt an user for data input; and b) receiving 480 data 170 from the user, wherein the data 170 comprise a status of at least one layout element 122, 123, 124-1, 124-2, 125, 126, 127 of human interface description 160.

In a preferred embodiment of method 400, the providing step 475 may comprise further the steps d) to f):

d) providing 450 layout template 140-1 and data description 140-2;

e) instantiating 460 data instance 150 from data description 140-2; and f) merging 470 data instance 150 with layout template 140-1 into human interface description 160.

Method 400 further comprises the optional step c) storing 485 (dashed line) data 170.

The steps are now explained in detail.

In the providing step 475, computer system 999 (cf. FIG. 1), may provide human interface description 160 (cf. FIG. 4) and a conventional browser may render human interface description 160 on an output device (e.g., output device 950; cf. FIG. 1) to prompt an user. Details of a preferred embodiment of the providing 475 step are described under FIG. 3. Preferably, human interface description 160 may be written in a markup language, such as XHTML. Table shows a XHTML example of human interface description 160 in the survey example. HTML instructions are known in the art and, therefore, are not explained in detail. The following line numbers refer to table 1. Line 4 represents two functions (e.g. JavaScript functions). Function a) sets a cursor position when human interface description 160 is loaded. Function b) determines the current cursor position when the user submits data through the human interface 951 (cf. FIG. 5). Further, function b) transfers the value of the cursor position to a first input field instruction in human interface description 160 (line 10). Preferably, the first input field is a hidden field. Second input field instruction with name attribute "//survey/planned_costs/travel" (line 19) corresponds to LE FieldInput 125. Each input field represents a data set of data 170 (cf. FIG. 4).

TABLE 1 human interface description 160 in the survey example

| Line | Code |
|---|---|
| 1 | <?xml version="1.0" encoding="utf-8"?> |
|   | <html xmlns="http://www.w3.org/TR/xhtml1"> |
| 2 | <head> |
| 3 | ... |
| 4 | <!--Functions (e.g. JavaScript): |
|   |   a) set cursor on page display |
|   |   b) determine cursor position on page submission |
|   | --> |
| 5 | ... |
| 6 | </head> |
| 7 | <body> |
| 8 |   <form method="post" name="survey"> |
| 9 |    ... |
| 10 |    <input type hidden name="//env:envelope/ env:states/uicl:page/@cursorPos" value="//survey/planned_costs/travel"/> |
| 11 |    ... |
| 12 |    <table> |
| 13 |     <tr> |
| 14 |      <td> |
| 15 |       <span>Planned travel costs 2002 :</span> |
| 16 |      </td> |
| 17 |      <td> |
| 18 |       <span> |
| 19 |        <input name="//survey/planned_costs/travel" type="text" value="0.0"/> |
| 20 |       </span> |
| 21 |      </td> |
| 22 |     </tr> |
| 23 |    </table> |
| 24 |    ... |
| 25 |   </form> |
| 26 |  </body> |
| 27 | </html> |

Figure 4:
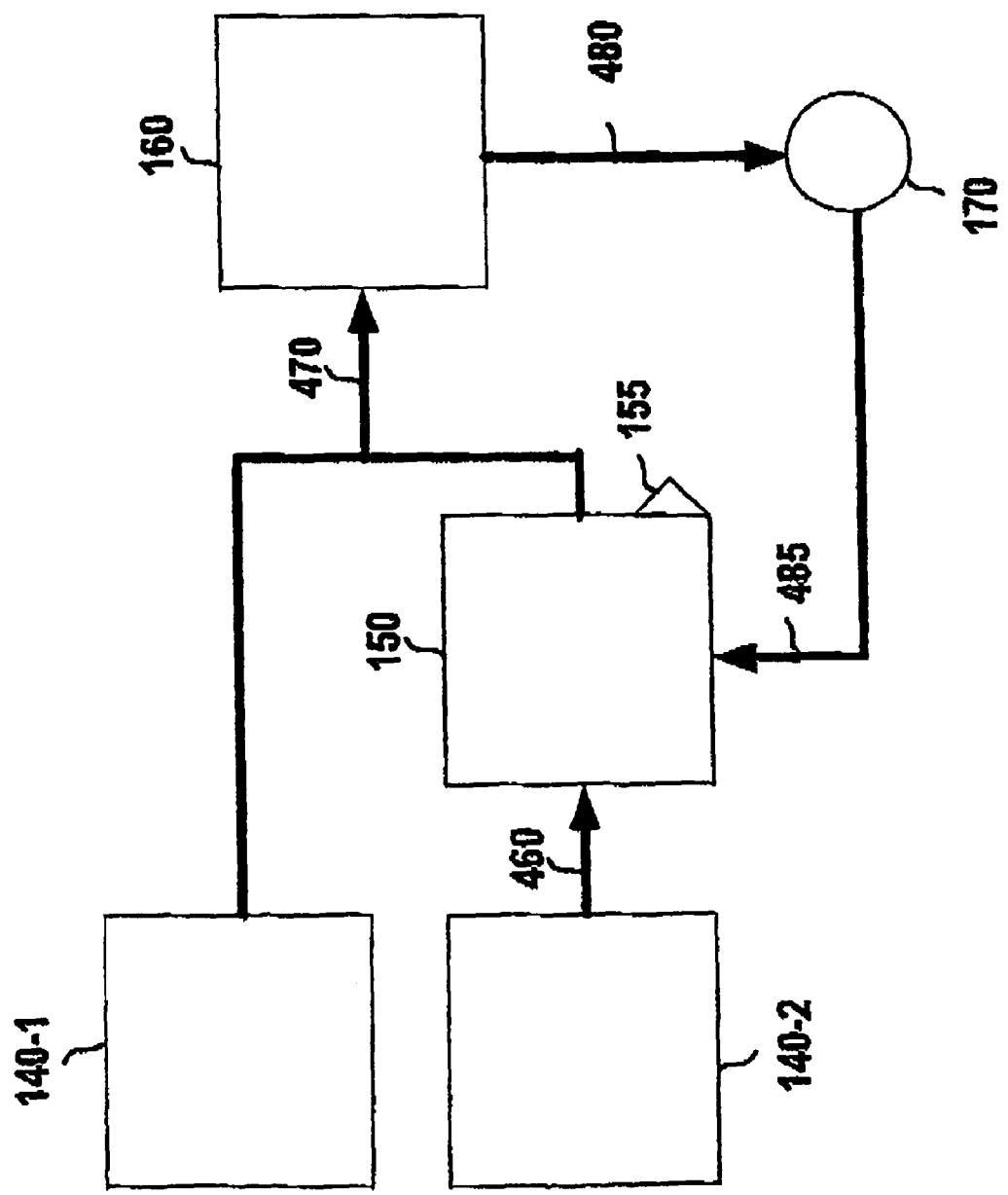
FIG. 4 illustrates processing of documents and data according to an exemplary implementation of the present invention.
Figure 5:
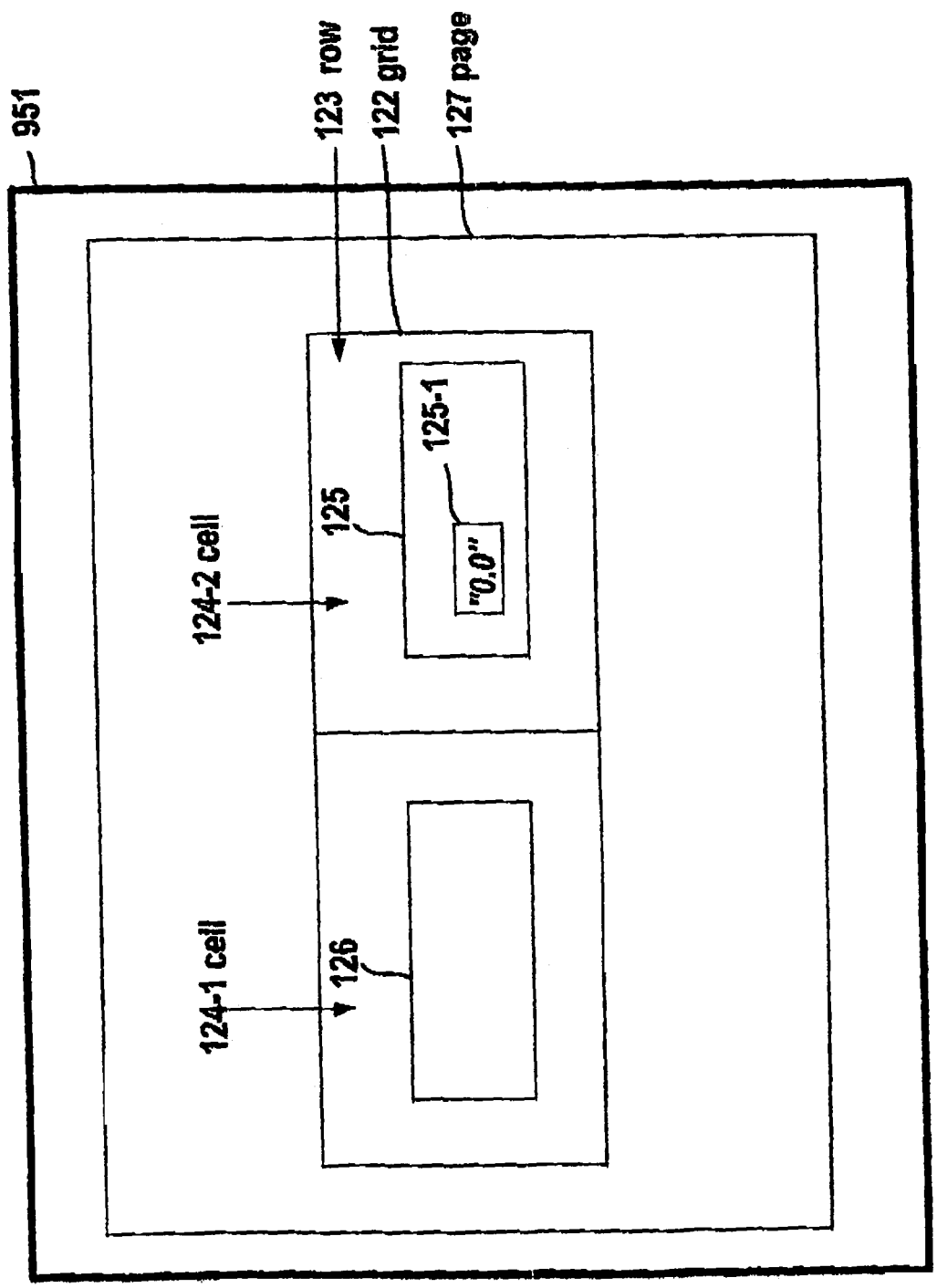
FIG. 5 illustrates a visual representation of an human interface description.

When computer system 999 renders human interface description 160, the user may be prompted with a screen that has a structure similar to the layout elements shown in FIG. 5. The user may read the question text in LE TextOutput 126 (line 15) and may be expected to input data in LE FieldInput 125, that corresponds to the second input field instruction, where a default value 125-1 (cf. FIG. 5, "0.0") is displayed (line 19). If more than one question is displayed, the user can perform more than one data input. After having finished all data inputs, the user may submit data 170 (cf. FIG. 4; table 2). For example submission of data 170 is performed by selecting an "ENTER" key on input device 940 (cf. FIG. 1).

In the receiving data step 480, a computer of computer system 999 (e.g. computer 900, cf. FIG. 1) receives data 170 from the user via user interface 960 (cf. FIG. 1). Data 170 comprise at least one data set.

Preferably, data 170 may be received in a format that comprises a name and a value for each data set of data 170 (cf., table 2). Preferably, the name of each data set may correspond to a XML Path Language (XPATH).

XPath is a language that describes a way to locate and process items in XML documents by using an addressing syntax based on a path through the document's logical structure or hierarchy. The XPath language is described in the "XPath W3C Recommendation Version 1.0, Nov. 16, 1999." XPath also allows the application programmer to deal with the document at a higher level of abstraction. XPath is a language that is used by and specified as part of both, XSLT and XPointer (SML Pointer Language). It uses the information abstraction defined in the XML Information Set (Infoset). Since XPath does not use XML syntax itself, it could be used in contexts other than those of XML.

Table 2 illustrates data 170 in the survey example. Each row of table 2 corresponds to a data set of data 170. In the example, the name of each data set is a XPath.

TABLE 2 format of data 170 in the survey example

| Name | Value |
|---|---|
| //env:envelope/env:states/uicl:page/@cursorPos | /survey/planned_costs/travel |
| //survey/planned_costs/travel | 5000 |
| ... | ... |

A first data set (table 2, line 2) corresponds to the first input field instruction and represents the status information of layout element page 127 (cf. table 1, line 10; FIG. 5). The status of a layout element comprises information about the layout element at the point in time when the user submits data 170. In the survey example, the status of LE page 127 is the position of a cursor on page 127 (cf. FIG. 5). In case, the user inputs, data into more than one LE FieldInput 125 (cf. FIG. 5), the cursor typically stays in the LE that received the last data input. For convenience of explanation, only LE FieldInput 125 is considered. In the example, the status "cursorPos" of LE page 127 is a unique pointer to LE 125. Such a pointer can be implemented as a unique ID for each LE. In the survey example, the data path "/survey/planned_costs/travel" (cf. value column of line 2 of table 2) serves as unique ID for LE FieldInput 125. Assuming that the cursor is in LE 125 when the user submits data 170 the status cursorPos of page 127 is set to "/survey/planned_costs/travel" in the first input field instruction of human interface description 160. This is achieved by using function b) (cf. table 1, line 4b) that determines the cursor position and transfers the cursor position value to the first input field instruction of document 160 (cf. table 1, line 10). The first input field content is part of data 170 (cf. data set in table 2, second row). Preferably, the name attribute of the first input field instruction "//env:envelope/env:states/uicl:page/@cursorPos" corresponds to a "state"-location (<env:states>; cf. table 2, line 6) in data instance 150. How to provide individual document description 160 by using data instance 150 is explained in detail under FIG. 3.

In the optional storing data step 485 (dashed lines), data 170 may be stored in memory. Preferably, data 170 are stored in data instance 150. In the example, the XPath in the name column of table 2 is compliant with data instance 150 structure (cf. table 3) and indicates the storage location of the corresponding value of each data set.

The value="/survey/planned_costs/travel" may be stored as value of page 127 attribute cursorPos (cf. table 3, line 7) at "state"-location <env:envelope><env:states><uicl:page . . . cursorPos=" . . . "> (cf. table 3, lines 6-9). Optionally, data 170 can also be stored elsewhere (e.g., in any memory 920, 920, 922 of computer system 999). When individual document description 160 is rendered at least a second time, function a) (cf. table I, line 4a) is executed to retrieve the page 127 layout element status information from data instance 150 and sets the cursor position accordingly.

Optionally, a second data set (cf. table 3, third row) of data 170 for the planned travel cost is stored in data instance 150 at the corresponding Location. In the survey example, the storage location in data instance 150 is implicitly known from the name column of table 2 (e.g. "//survey/planned_costs/travel"). The corresponding value ("5000", line 13) was entered by the user as planned travel cost value.

Preferably, data instance 150 may be a markup language document, such as an XML document. Table 3 gives a XML example of data instance 150 in the survey example. The following line numbers refer to table 3. Table 3 illustrates an XML envelope (lines 2, 17) comprising runtime dependent data user name ("USER1", line 4) in its header (lines 3, 5), whereas a data description (lines 11-13) forms its body (lines 10, 16). Layout element status information is stored in lines 6-9. The envelope name space is represented by the prefix "env:".

Figure 3:
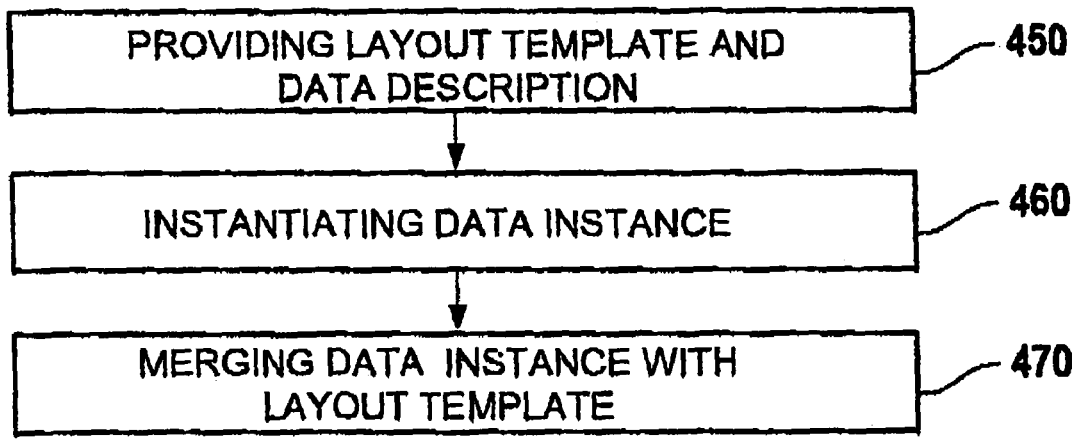
FIG. 3 illustrates details of a method step of an exemplary implementation of the present invention.

Optionally, after having stored or before storing data 170, the data 170 can be processed by an application program (e.g. computer program 101, cf. FIG. 1) by using interface 155, similar to the description of the merging step 470 in FIG. 3.

TABLE 3 data instance document 150

| Line | Code |
|---|---|
| 1 | <?xml version="1.0" encoding="utf-8"?> |
| 2 | <env:envelope<br>xmlns:env="http://www.sap.com/sapsurvey/env"> |
| 3 | <env:header> |
| 4 | <env:user>USER1</env:user> |
| 5 | </env:header> |
| 6 | <env:states> |
| 7 | <uicl:page id="survey"<br>cursorPos="/survey/planned_costs/travel"<br>xmlns:uicl="http://www.sap.com/sapsurvey/page"/> |
| 8 | ... |
| 9 | </env:states> |
| 10 | <env:body> |
| 11 | <survey> |
| 12 | <planned_costs> |
| 13 | <travel>5000</travel> |
| 14 | </planned_costs> |
| 15 | </survey> |
| 16 | </env:body> |
| 17 | </env:envelope> |

FIG. 3 illustrates details of the providing step 475. Providing step 475 may comprise further the steps of:

d) providing 450 layout template 140-1 (cf. FIG. 4) and data description 140-2 (cf. FIG. 4);

e) instantiating 460 data instance 150 (cf. FIG. 4) from data description 140-2; and f) merging 470 data instance 150 with layout template 140-1 into human interface description 160 (cf. FIG. 4)

The steps d) to f) are now explained in detail.

In the providing 450 step, computer system 999 may provide layout template 140-1 and data description 140-2. For example, layout template 140-1 and data description 140-2 may be retrieved from memory 920 (cf. FIG. 1).

Preferably, layout template 140-1 is a style sheet language transformation, such as XSLT, that comprises XSL instructions with layout information. These instructions are applied to a XML document, such as data instance 150, that comprises data. Table 4 shows layout template 140-1 that is used in the survey example.

The function of layout template 140-1 is explained in detail in the merging step 470 description of FIG. 3.

TABLE 4 layout template document 140-1 in the survey example

| Line | Code |
| --- | --- |
| 1 | <?xml version="1.0" encoding="utf-8"?> |
| 2 | <xsl:transform version="1.0" xmlns:xsl= "http://www.w3.org/1999/XSL/Transform"> |
| 3 | <xsl:template match="/"> |
| 4 | ... |
| 5 | <html> |
| 6 | <form method="post" name="survey"> |
| 7 | <table class="Grid"> |
| 8 | <xsl:if test="{boolean(//survey/planned_costs/travel)}"> |
| 9 | <tr class="row"> |
| 10 | <td><span class="TextOutput">Planned travel costs 2002 :</span></td> |
| 11 | <td><input class="InputField" name="//survey/planned_cost/travel" type="text"> |
| 12 | <xsl:attribute name="value"> |
| 13 | <xsl:value-of select= "//env:envelope/env:body/ survey/planned_costs/travel"/> |
| 14 | </xsl:attribute> |
| 15 | </input></td> |
| 16 | </tr> |
| 17 | </xsl:if> |
| 18 | </table> |
| 19 | </form> |
| 20 | </html> |
| 21 | ... |
| 22 | </xsl:template> |
| 23 | </xsl:transform> |

Preferably, data description document 140-2 is written in a markup language, such as XML. The data description 140-2 that is used in the survey example is shown in table 5. The following line numbers refer to table 5. Line 1 indicates a XML document. Lines 2-4 define the data path "//survey/planned_costs/travel" of default value "0.0" (line 4). The closing tags </ . . . > (lines 4 to 6) complete the definition of the data path.

TABLE 5 data description document 140-2 in the survey example

| Line | Code |
| --- | --- |
| 1 | <?xml version="1.0" encoding="utf-8"?> |
| 2 | <survey> |
| 3 | <planned_costs> |

TABLE 5-continued data description document 140-2 in the survey example

| Line | Code |
| --- | --- |
| 4 | <travel>0.0</travel> |
| 5 | </planned_costs> |
| 6 | </survey> |

In the instantiating step 460, computer system 999 may complement data description 140-2 by further runtime dependent data (data that are created or modified during runtime) resulting in data instance 150 (cf. table 3). By way of a non-limiting example, runtime dependent data include user name, document creating date, session ID, error messages, and layout element status, etc.

If required, data instance 150 may be modified, for example, by an application program (e.g., computer program 101 on computer 901). This may be achieved through interface 155. For example, computer system 999 (cf. FIG. 1) transfers data of data instance 150 (e.g., on computer 900) to the application program through interface 155 and data instance 150 receives modified data from the application program through interface 155. An advantage is an application specific initialization of data instance 150. For example, in the survey example a user (e.g., USER1, cf. table 3, line 4) wants to input the planned travel costs for the fiscal year. The default value that is derived from the corresponding data description 140-2 is "0.0" (cf. table 3, line 9). In the example, the application program knows the real travel cost of the user for the previous fiscal year. The application program is called through interface 155 and runs a query for the previous travel cost. The result value is returned to data instance 150 through interface 155 and replaces the old default value.

In the merging step 470, layout template 140-1 may be applied to data instance 150. Preferably, this may correspond to a style sheet transformation (cf. table 4) of data instance 150 where layout element information is merged with data. For convenience of explanation, resulting human interface description 160 is discussed by using the second input field instruction in line 19 of table 1 as an example, because it comprises both layout information and data. The following line numbers without explicit table reference refer to table 4 (layout template 140-1).

Lines 11-15 generate line 19 of table 1. Line 11 generates the second input field instruction with the name attribute "//survey/planned_costs/travel" and the type attribute "text". Lines 12, 14 define the value attribute. Line 13 comprises an instruction to get the value of the value attribute from a location with "//env:envelope/env:body/survey/planned_costs/travel" as data path. When this instruction is applied to data instance 150, the corresponding value (cf. table 3, line 13) is retrieved as the value of the value attribute of the second input field instruction. When human interface description 160 is merged in the survey example with data instance 150 for the first time, the value would either be the default value "0.0" from data description 140-2 or a value that was modified by an application program through interface 155. When the merging is performed after the user submitted data 170, the value would be the user input "5000" stored in data instance 150 (cf. line 13 of table 3) or a value that was modified by an application program through interface 155.

FIG. 4 illustrates processing of documents and data according to an exemplary implementation of the present invention.

The user may submit data 170 by using human interface description 160. Data 170 may comprise status information of at least one layout element 122, 123, 124-1, 124-2, 125, 126, 127 (cf. FIG. 5). Computer system 999 (cf. FIG. 1) receives 480 data 170. Optionally, computer system 999 stores 485 data 170 in data instance 150. Data instance 150 can be modified by an application program (e.g., computer program 101, cf. FIG. 1) via interface 155. Preferably, computer system 999 provides human interface description 160 by merging 470 layout template 140-1 with data instance 150. Preferably, data instance 150 is instantiated from data description 140-2.

FIG. 5 illustrates a visual representation of individual document description 160 on human interface 951.

In the survey example, XHTML instructions (cf. table 1) of individual document description 160 result in layout elements page 127, grid 122, row 123, cells 124-1, 124-2, TextOutput field 126, FieldInput 125 and attribute 125-1. Preferably, a conventional browser renders individual document description 160 to prompt a user with human interface 951 for data input into field 125 on output device 950 (cf. FIG. 1).

Having described the present invention as computer-implemented method 400 the invention is now described as computer system 999.

The inventive computer system 899 provides and processes a human interface description.

It may be assumed that computer 900 (cf. FIG. 1) is the operating computer. However, a person of skill in the art can implement the invention also in a client-server system, where a server computer (e.g., computer 901, cf. FIG. 1) is used for data processing and a client computer (e.g., computer 900) serves as a front-end computer for the user.

A preferred embodiment of computer system 999 may comprise the following:

a) means for providing 475 (cf. FIG. 2) human interface description 160 (cf. FIG. 4) to prompt an user for data input; and b) means for receiving 480 (cf. FIG. 2) data 170 (cf. FIG. 4) from the user, wherein the data 170 comprise a status of at least one layout element 122, 123, 124-1, 124-2, 125, 126, 127 of human interface description 160.

Preferably, means a) comprises a conventional browser program (not shown), such as the Microsoft Internet Explorer or the Netscape Navigator, executed by a processor of a computer (e.g. processor 910 of computer 900) and a computer program for retrieving human interface description 160 from memory 920. The browser may render human interface description 160 and display the result as human interface 951 (cf. FIG. 5) on output device 950 (cf. FIG. 1). Preferably, human interface 951 prompts a user to input data 170 through human interface 951. The user may input data via input device 940 (cf. FIG. 1). For example, the user selects a displayed input field in human interface 951 via a mouse device and enters data via a keyboard or even a microphone. A function in human interface description 160 (e.g., a JavaScript function) determines the status of at least one layout element 122, 123, 124-1, 124-2, 125, 126, 127 (cf. FIG. 5) and, preferably, transfers the status to a first input field instruction (cf. table 1, line 10) of human interface description 160. The content of the first input field instruction becomes part of submitted data 170. Preferably, data 170 have a format according to table 2. Like other data sets of data 170, preferably, the status also may comprise a name with the XPath.

Preferably, means b) comprises the browser program and the basic input/output system (BIOS) of computer 900. The BIOS is receiving signals from input device 940 via bus 930 (cf. FIG. 1). For example, the signals are interpreted as characters or bitmaps or any other pattern that can be appropriately displayed or played by the browser on output device 950. Upon submission of data 170 by the user (e.g. by using the ENTER key of a conventional keyboard), computer 900 receives data 170 via bus 930.

Optionally, in the preferred embodiment, computer system 999 further comprises c) means for sorting 485 (cf. FIG. 2) data 170 (cf. FIG. 4). Preferably, means c) comprises a storage program and a XML document. The storage program may automatically store data 170 in the runtime memory portion of memory 920 that belongs to the XML document (e.g., data instance 150; cf. FIG. 4). Preferably, the exact storage address is derived from the XPath in the name of each data set of table 2.

In a preferred embodiment, means further comprises means d), e) and f):

d) means for providing 450 layout template 140-1 and data description 140-2;

e) means for instantiating 460 (cf. FIG. 2) data instance 150 (cf. FIG. 7) from data description 140-2; and f) means for merging 470 (cf. FIG. 2) data instance 150 with layout template 140-1 into human interface description 160 (cf. FIG. 7).

Preferably means d) is a computer program that retrieves layout template 140-1 and data description 140-2 from a storage location either inside (e.g. memory 920) or outside of computer system 999 and stores layout template 140-1 and data description 140-2 in a memory of computer system 999 (e.g. memory 920) that can be accessed by means e) and f).

Preferably, means e) is a computer program that reads data description 140-2 from memory 920 and creates data instance document 150 in a runtime portion of memory 920 (e.g., a RAM for storing runtime data) by adding runtime dependent data to the data of data description 140-2. Runtime dependent data may be created or modified, e.g., by an application program (e.g., 101 on computer 901, cf. FIG. 1 description), during runtime. Table 3 shows an example of data instance 150, which is implemented as a markup language document.

Preferably, means f) comprises layout template 140-1, which is a style sheet language transformation document (cf. table 4) in the example. Processor 910 may read layout template 140-1 from memory 920 and apply it to data instance 150. The result is individual human interface description 160 (cf. XHTML example in table 1), which may be a markup language document that is stored in a runtime portion of memory 920.

Having described the present invention as computer implemented method 400 and computer system 999, it is now described as a computer program product 100 (cf. FIG. 1) that can be stored on a computer readable data carrier 970 (cf. FIG. 1).

Computer program product 100 may have a plurality of instructions for causing a processor (e.g., processor 910) of a computer (e.g., computer 900) to create and process a human interface description. Computer program product 100 may cause computer 900 to execute the following steps a) and b):

a) providing 475 human interface description 160 to prompt an user for data input; and b) receiving 480 data 170 from the user, wherein the data 170 comprise a status of at least one layout element 122, 123, 124-1, 124-2, 125, 126, 127 of human interface description 160.

Computer program product 100 may cause computer 900 to further execute the optional step of:

c) storing 485 the data 170.

In a preferred embodiment of the present invention, computer program product 100 may cause computer 900 to execute the providing step a) through the following sub-steps d) to f):

d) providing 450 layout template 140-1 and data description 140-2;

e) instantiating 460 data instance 150 from data description 140-2; and f) merging 470 data instance 150 with layout template 140-1 into human interface description 160.

Computer program 100 steps a) to f) may be equivalent to method 400 steps a) to f) described in detail under FIGS. 2 and 3.

Computer program product 100 can be stored on computer readable data carrier (e.g. data carrier 970).

| Reference number table | |
|---|---|
| Reference | Description |
| 100, 101, 102 | Computer program products |
| 140-1 | Layout template |
| 140-2 | Data description |
| 150 | Data instance |
| 155 | Application interface |
| 160 | Human interface description |
| 170 | Data |
| 400 | Method |
| 4xx | Method steps |
| 999 | Computer network system |
| 900, 901, 902 | Computers |
| 910, 911, 912 | Processors |
| 920, 921, 922 | Memories |
| 930 | Bus |
| 940 | Input device |
| 950 | Output device |
| 951 | Cursor |
| 960 | User interface |
| 970 | Program/data carrier (computer readable device) |
| 980 | Program signal |

The invention claimed is:

1. A method for maintaining a layout of a user interface between multiple accesses, the method comprising:

providing a layout template and a data description;

instantiating a data instance from the data description by complementing the data description with runtime dependent data including status parameters;

merging the data instance with the layout template into a user interface description;

displaying, on a display device, a first display comprising a first plurality of layout elements arranged in an expandable and collapsible hierarchy and having the status parameters reflecting a hierarchical state, the first display being generated in accordance with the user interface description;

receiving user input to collapse or expand at least one of the first layout elements;

determining, by executing a function in the user interface description on at least one processor, a status of the changed first layout elements;

updating a status parameter value of the status parameters in a hidden input field of the user interface description to reflect the expansion or collapse of the at least one of the first layout elements;

receiving data, from the user, into a data input field for processing after the at least one of the first layout elements is expanded or collapsed;

forwarding the data with the status parameter value in the hidden input field to a server computer;

displaying, on a display device, a second display, after forwarding the data to the server, comprising a second plurality of layout elements arranged in an expandable and collapsible hierarchy, the second display being generated in accordance with the user interface description and the second plurality of layout elements being arranged in the hierarchical state of the first layout elements by using the updated determined status parameter value.

2. The method of claim 1, further comprising the step of: storing the data and the updated status parameter value.

3. The method of claim 1, wherein the merging uses a transformation program in a programming language.

4. The method of claim 3, wherein the transformation program is a style sheet language transformation.

5. The method of claim 1, wherein the data and the updated status parameter value comprises an XPath.

6. A computer-readable medium storing program instructions, which, when executed by a processor, cause the processor to perform a method for maintaining a layout of a user interface between multiple accesses, the method comprising:

providing a layout template and a data description;

instantiating a data instance from the data description by complementing the data description with runtime dependent data including status parameters;

merging the data instance with the layout template into a user interface description;

displaying, on a display device, a first display comprising a first plurality of layout elements arranged in an expandable and collapsible hierarchy and having the status parameters reflecting a hierarchical state, the first display being generated in accordance with the user interface description;

receiving user input to collapse or expand at least one of the first layout elements;

determining, by executing a function in the user interface description on at least one processor, a status of the changed first layout elements;

updating a status parameter value of the status parameters in a hidden input field of the user interface description to reflect the expansion or collapse of the at least one of the first layout elements;

receiving data, from the user, into a data input field for processing after the at least one of the first layout elements is expanded or collapsed;

forwarding the data with the status parameter value in the hidden input field to a server computer;

displaying, on a display device, a second display, after forwarding the data to the server, comprising a second plurality of layout elements arranged in an expandable and collapsible hierarchy, the second display being generated in accordance with the user interface description and the second plurality of layout elements being arranged in the hierarchical state of the first layout elements by using the updated determined status parameter value.

* * * * *